US005230763A

United States Patent [19]

Roth et al.

[11] Patent Number: 5,230,763

[45] Date of Patent: Jul. 27, 1993

[54] PROCESS FOR MANUFACTURING A SURFACE ELEMENT TO ABSORB ELECTROMAGNETIC WAVES

[75] Inventors: Klaus Roth, Viernheim; Joachim Mellem, Schriesheim, both of Fed. Rep. of Germany

[73] Assignee: Isover Saint-Gobain, Courbevoie, France

[21] Appl. No.: 571,867

[22] Filed: Aug. 24, 1990

[30] Foreign Application Priority Data

Aug. 24, 1989 [DE] Fed. Rep. of Germany ......... 3928018

[51] Int. Cl.[5] ........................ B32B 31/18; B32B 19/04; H01Q 17/00

[52] U.S. Cl. .................................... 156/254; 156/264; 342/1; 428/920

[58] Field of Search .............................. 342/1, 2, 3, 4; 156/254, 264, 260, 259; 428/920

[56] References Cited

U.S. PATENT DOCUMENTS

| | | | |
|---|---|---|---|
| 2,036,467 | 4/1936 | Ellis | 428/920 |
| 3,092,203 | 6/1963 | Slayter et al. | 156/254 |
| 3,179,317 | 4/1965 | Voelker | 156/254 |
| 3,315,260 | 4/1967 | Wesch | 342/3 |
| 3,454,947 | 7/1969 | Wesch et al. | 342/1 |
| 3,549,449 | 12/1970 | Windecker | 156/254 |
| 3,669,789 | 6/1972 | Utsugi et al. | 156/254 |
| 4,025,680 | 5/1977 | Botsolas et al. | 138/149 |
| 4,327,364 | 4/1982 | Moore | 342/1 |
| 4,381,510 | 4/1983 | Wren | 342/1 |
| 4,514,247 | 4/1985 | Zola | 156/254 |
| 4,581,284 | 4/1986 | Eggert et al. | 428/283 |
| 4,906,504 | 3/1990 | Petersen | 428/920 |
| 5,085,931 | 2/1992 | Boyer | 342/1 |
| 5,121,122 | 6/1992 | Frye | 342/1 |

FOREIGN PATENT DOCUMENTS

| | | | |
|---|---|---|---|
| 0000378 | 1/1979 | European Pat. Off. . | |
| 0183375 | 11/1982 | Japan | 156/254 |
| 0664185 | 2/1988 | Switzerland | 156/254 |
| 1074899 | 7/1967 | United Kingdom . | |
| 1397299 | 6/1975 | United Kingdom . | |

*Primary Examiner*—Michael W. Ball
*Assistant Examiner*—Daniel J. Stemmer
*Attorney, Agent, or Firm*—Oblon, Spivak, McClelland, Maier & Neustadt

[57] ABSTRACT

A process for the manufacture of a surface element in the form of a lamellar mat or sheet which can be used for the absorption of electromagnetic waves, in particularly radar waves. The surface element has a plurality of bands of mineral wool separated by bands of an electrically-conducting material and is manufactured on an industrial scale by stacking several mineral wool strips, sheets, or mats with intermediate layers of the electrically-conducting strips, sheets or mats into a pile. From this pile are then cut out pads composed of different bands which are laid out in such way that their cut faces become the large surface areas of the surface element. Then, each of the surface elements is clad on at least one face with a backing strip, for example of meshed aluminum foil, the main orientation of the fibers of the mineral wool being perpendicular to the backing strip.

6 Claims, 2 Drawing Sheets

Fig. 1a
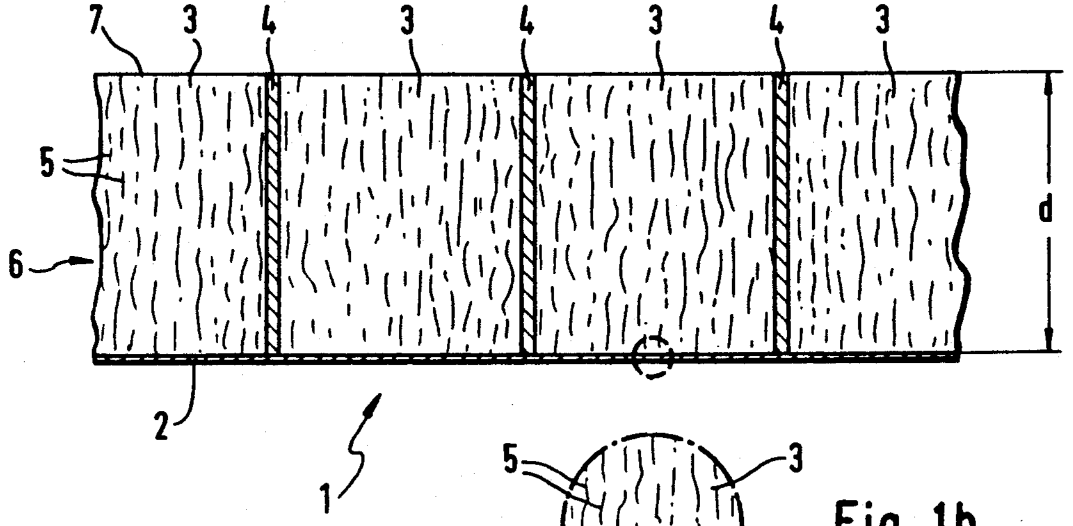
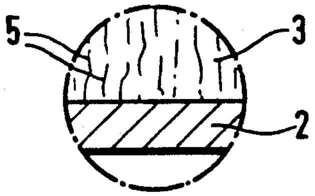
Fig. 1b
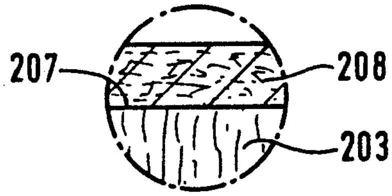
Fig. 2b
Fig. 2a
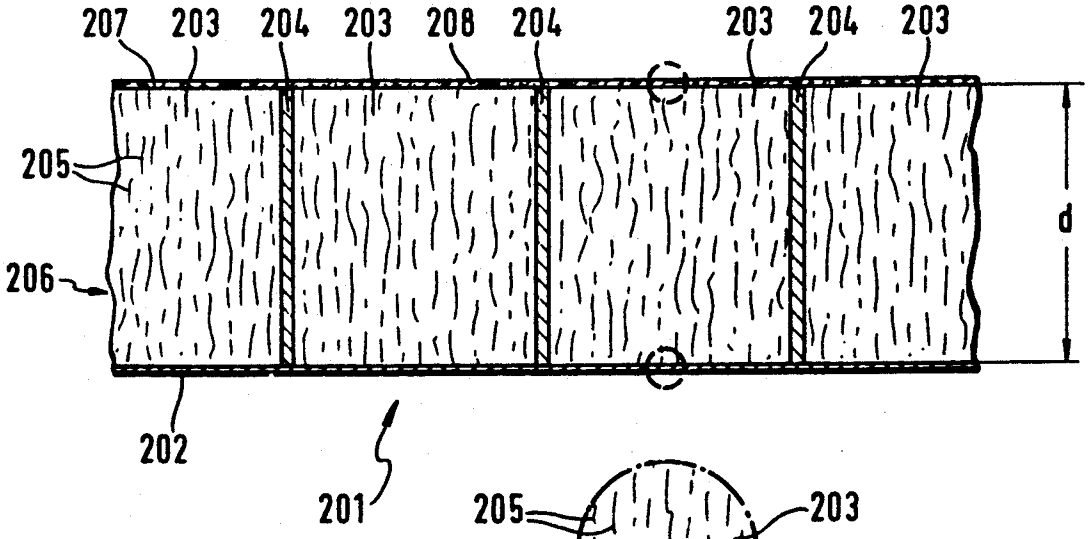
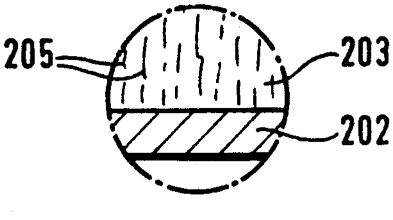
Fig. 2c

PROCESS FOR MANUFACTURING A SURFACE ELEMENT TO ABSORB ELECTROMAGNETIC WAVES

BACKGROUND OF THE INVENTION

1. Field of the Invention

The invention concerns a process for manufacturing a surface element to absorb electromagnetic waves.

2. Discussion of the Background

Buildings reflecting electromagnetic waves, particularly radar waves, and situated in airport zones, may disturb the radar detection necessary for air safety. The new development of a surface element absorbing electromagnetic waves, particularly radar waves, has resulted in a construction wherein sections of mineral wool sheets and those of an electricity-conducting material are laid alternately in a block or a box to serve as a radar absorber, for example for building facades. The process for manufacturing these surface elements has been, however, complicated and had to be done mainly by hand. This has the disadvantage of being scarcely able to guarantee a homogeneous structure of the surface elements made in this manner, and also the manual manufacture of these surface elements results in a very high cost of manufacture.

SUMMARY OF THE INVENTION

The aim of this invention is therefore to make available a process for manufacturing flat materials for absorbing electromagnetic waves, particularly radar waves, in order to provide such materials on an industrial scale.

This task is accomplished using the characteristics of the present invention.

In accordance with the present invention, several strips, sheets or mats of mineral fibers whose fibers are essentially parallelly oriented in relation to the large surface areas are alternately stacked with layers of electricity-conducting members in the form of strips, sheets or mats. The stack is cut out, vertically in relation to the orientation of the fibers, into pads composed of layers and laid so that their cut faces become the large surface areas of the surface element. A backing strip is then applied which contacts at least one face of each of the surface elements.

Stacking of several strips, sheets or mats of mineral wool, whose fibers are essentially laid parallel in relation to surfaces of the layered strips, sheets or mats of electricity-conducting material, has the advantage firstly of providing flat elements of mineral wool prefabricated on an industrial scale which can be of considerable length, so that the next stage of the process can occur, namely cutting out pads of the formed pile composed of a different band of elements, in order to produce a large number of pads. At the same time, the length of the pads can be different depending on the depth of the pile.

The cutting stage can particularly be carried but advantageously and effectively by using a double toothed sharp undulated cutter with a reciprocating movement for cutting out pads from the pile during a to-and-fro movement.

Covering with a backing strip has the advantage firstly of also being accomplished automatically, and secondly a backing strip can confer high mechanical strength to the manufactured surface element for absorbing electromagnetic, and particularly, radar waves.

In addition, using a backing strip has the advantage that the surface elements, obtained according to the process which is the subject of this invention, allow for forming a practically endless element by laying the pads one next to the other before covering the whole line of pads with a backing strip. An endless surface element thus realized can, for example, be wound round a core to form a compact roll enabling the surface element to be cut to the desired length.

In addition, since all the stages can be automated, the process which is the subject of this invention enables the production of a large number of surface elements with the electromagnetic wave absorbing characteristics, and thus provides a process for manufacturing these surface elements on an industrial scale. For example it is possible to obtain selective ray absorption in specific surface elements, in the sense of a narrow-band absorber, by adapting the ratio of the bands and/or their thickness in relation to the length of the radiation waves to be absorbed. To do this, the ratio does not necessarily have to be 1:1, but can increase to be 1:2, 1:3, 1:4 etc., with a view to absorbing a wider band of electromagnetic waves, and radar waves in particular.

A surface element composed of elements with bands of different texture has been known from U.S. Pat. No. 4,025,680, however, an element such as this serves solely for heat-insulation of a tubular construction member.

As regards technical measures for realizing the process which is the subject of the invention, reference is made to the entire contents of EP 000 378 and of DE 36 26 244 which, in another context, present techniques which are also applicable to the process which is the subject of the invention.

To implement the known devices, one must, however, take into account the fact that it may perhaps be necessary to modify the cutting device, namely when the pile to be cut is composed of layers of material of very different apparent density. In this case, due to the different depth of bite of the cutting device, a so-called undulated cut may occur, with the effect being that the cladding would be laid on the cut pad in only an approximate manner from time to time. It is for this reason that, if necessary, the saw blade of the cutting device much be adapted to the new situation.

Similarly, angular and vacuum transportation plus the quantity of glue, etc., must, if necessary, be adapted to help obtain the surface element desired.

Advantageously, according to the present invention, two faces of the surface element are clad.

Using the features of the present invention, a lamellar sheet of high mechanical strength can be realized on an industrial scale. It is advantageous to use such a lamellar sheet, for example, to cover flat surfaces, since they are practicable for a short duration by reason of their solidity.

It is possible to cut a surface element clad on both faces, with parallel orientation to the cladding in order of obtaining two surface elements with cladding on a single face.

The present invention has the advantage that a large number of surface elements for absorbing electromagnetic waves, particularly radar waves, can thus be manufactured at low cost as compared with the already effective automatic production of surface elements of the desired final thickness. Advantageously, a metal foil—if necessary, a reinforced metal foil—is used as a backing strip.

The implementation of a backing strip of aluminum foil or reinforced aluminum foil according to the present invention has the advantage firstly, that favorable mechanical strength of the surface element is obtained. Secondly, this backing strip acts as an internal reflector of the radar onto the face of the surface element, where the radar waves arrive after passing through the bands. In the presence of a thickness of a layer which, particularly in the context of having a ratio of band elements of different structure, is also adapted to the wavelength of the rays to be absorbed, phase shifting between the radar rays arriving on the front face of the bands and those reflected on the backing strip is influenced in such way that the majority of the waves are erased.

According to another aspect of the present invention, the front face of the elements is in the form of bands, and therefore the face on which the electromagnetic waves to be absorbed arrive, can also be clad with a strip. However, this is not formed of an electrically-conducting material, but instead is, for example, of a non-woven glass fiber, which remains inert in relation to the radar radiation, and which confers a high mechanical strength upon all of the surface elements, particularly bending strength. Thus, for example, covering one face of a surface element with aluminum foil and covering the face intended to absorb the radiation with a non-woven glass fiber material enables the surface element to be of sheet form. This confers high mechanical strength and also offers all the advantages of absorbing electromechanical waves, particularly the radar waves described earlier.

In addition, the open pore surface of a backing strip of non-woven fiber material allows sound waves to penetrate into the mineral fiber bands, via the backing strip of non-woven fibers, and be absorbed inside the mineral wool bands. Such a surface element also, in addition to the advantageous heat insulation, has a considerable soundproofing effect.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1*a* and 1*b* show cross-sectional views of a first embodiment of a surface element manufactured according to the process which is the subject of the invention, with a backing strip being located on one side only.

FIGS. 2*a*–2*c* show cross-sectional views of a second embodiment of a surface element manufactured according to the process which is the subject of the invention, with backing strips being located on both sides thereof.

DESCRIPTION OF THE PREFERRED EMBODIMENTS

Figure 3:
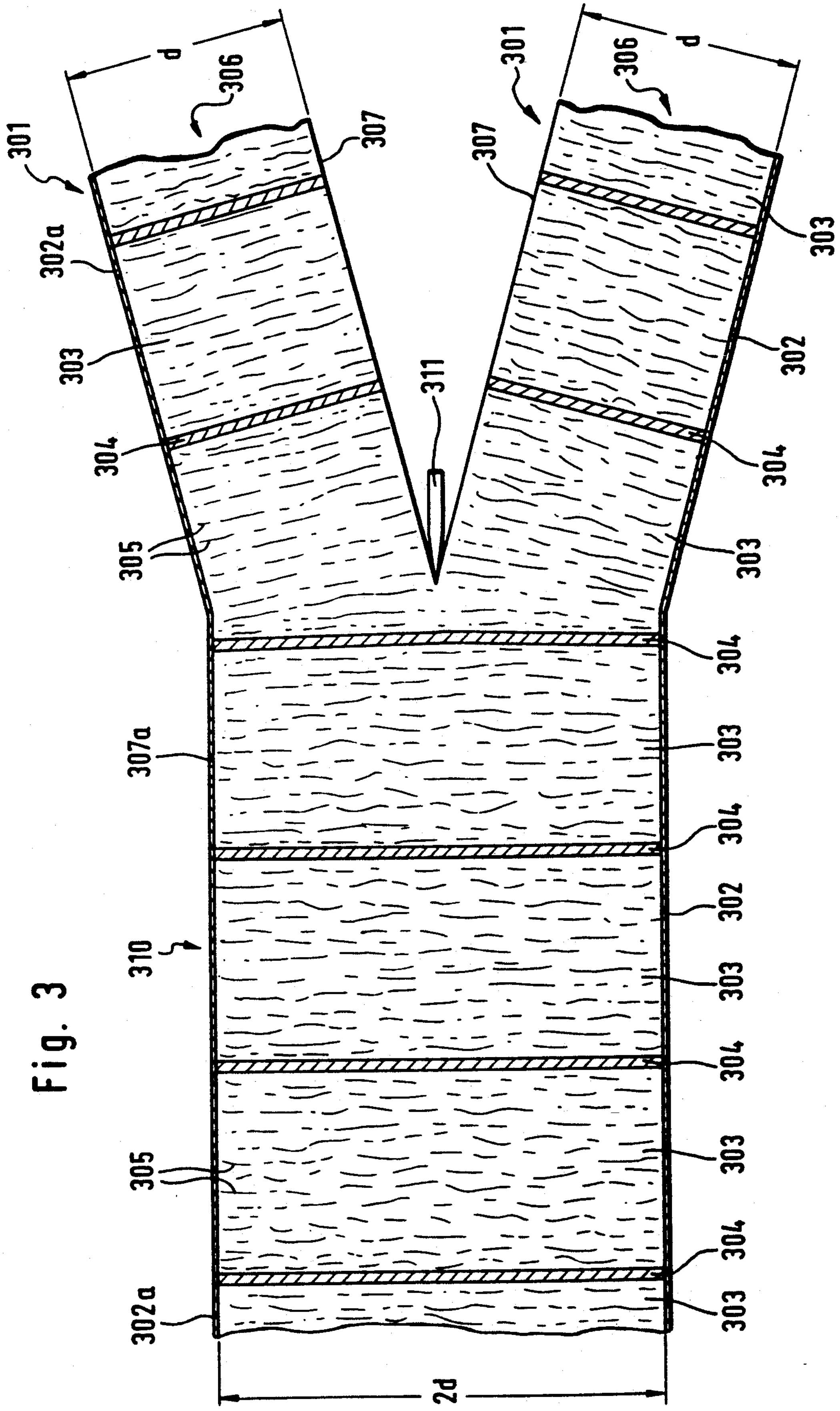
FIG. 3 is a cross-sectional view of a semi-finished surface element product manufactured according to the process which is the subject of the invention.

FIG. 1 illustrates a surface element in the form of a mat. For such a surface element 1, a backing strip 2 of reinforced aluminum foil of 30 m thickness backs wide mineral wool bands 3 laid parallel. In this example they are glass wool bands, and in both examples they are associated with narrower strips 4 of non-woven graphite-impregnated glass fiber.

The main orientation of the fibers 5 in the glass wool elements 3 is perpendicular to backing strip 2. Bands 3 and 4 alternating in the example of the present invention and having a defined ratio, form an isolating layer 6 which is glued onto backing strip 2 in the form of meshed aluminum foil, so that the entire surface element 1 has the form of a so-called lamellar or thin mat.

The differences between the two narrow bands 4 in relation to the length of the electromagnetic waves to be absorbed, namely radar waves, are designed in such way that absorption occurs inside the surface element 1, namely absorption of the resonance of entering waves. In addition, it is possible, if necessary, to adapt the thickness of the insulating layer to the length of the radiation waves to be absorbed. Such a process results in a so-called narrowband absorber.

As regards the other possibilities of implementation and the advantages and the compression strength of a surface element 1 in the form of a lamellar mat, reference is made to the contents of the German patent application P 38 05 269.5 by the same applicant.

Another form of surface element 1 manufactured according to the invention is shown in FIG. 2. In FIG. 2 elements with a similar effect and function have the same numbers used in FIG. 1, but are in a 200 series.

Because of a supplementary backing strip 208, surface element 201 shown in FIG. 2 is in the form of a lamellar or thin mat.

Surface element 201 includes, for example, a supporting strip 202 of aluminum foil, together with bands 203 of glass wool fixed by gluing and narrower bands 204 of a metal foil or for example of a non-woven material with graphite added or even a non-woven carbon material. For providing an insulating layer 206 for absorbing radar waves, surface 207 of surface element 201 is covered with a supplementary backing strip 208 of a non-electrically conducting material, which in the case of the example of a non woven glass-fiber material, has a density of approximately 170–180 g/cm$^2$. A non-woven material of glass fiber such as this, used as supplementary backing 208 can be penetrated by electromagnetic waves, particularly radar waves, in such a way that the latter waves are absorbed according to the mechanism described in the example shown in FIG. 1. Thus, no radar radiation which might otherwise disturb air safety leaves the surface element 201.

The supplementary backing strip 208 has the advantage firstly of having better mechanical strength, particularly bending strength than when the surface element is only in the form of lamellar sheet 201. Secondly, the supplementary isolating layer 208 protects the material of bands 203 and 204 from clogging and deterioration. Surface elements 1 and 201 can, for example, be implemented as a radar-absorbing covering, for reflecting radar waves, and in the present case, for buildings in particular. Utilization of surface element 1 or 201 also has the advantage that a building, thus clad, benefits from both soundproofing and heat insulation.

Of course, a covering which uses surface elements 1 or 201 in the form of lamellar mats or sheets enables the installation of an exterior surface covering normally used in construction such as, for example in Ethernit, wood, plastic materials or similar construction material.

A particular advantage of surface element 1 in the form of a lamellar or thin mat resides in the fact that it is also suitable for insulating undulated surfaces and that the surface elements 1 and 201 have a relatively high mechanical strength. The wide bands 3 and 203 essentially contain glass wool, the main orientation of whose fibers is perpendicular to the backing strip 202 or 208.

Of course, implementation of the surface element according to the present invention goes beyond its use as a radar absorber. Thus, for example, it is possible to overcome problems of heat insulation and/or soundproofing by varying the type of insulating material of bands 3 and 203, and also of bands 4 of 204.

Surface elements 1 or 201 in accordance with the present invention, can for example, be implemented both for heat insulation and absorption of rays in microwave appliances of all kinds. During implementation as a radar absorber in the narrow and/or wideband spectrum, an insulating material with an apparent density of 25 to 70 $kg/m^3$ is typically used.

FIG. 3 shows a particularly economical way of manufacturing a surface element 302. Elements here having the same function bear the same numbers as in FIG. 1, but are indicated as being in the 300 series.

According to FIG. 3, a semi-finished product with a surface element 301 is first manufactured on a production line. This semi-finished product 301 has an insulating layer 306 with a thickness of 2d as illustrated. The lamellar or thin bands forming band elements 303 or 304 are then joined by being glued to a bottom and top backing strip 302 or 302*a*. The semi-finished product of surface element 310 is then split in the middle using a single toothed sharp undulated cutter 311, thus creating two surface elements 301, 301 in the form of lamellar mats which, if required, are then wound round a coiling device, for example a coil core, and surfaces 307 of each surface element 301, 301 can be provided with a supplementary backing strip. It is also possible to avoid the separation cut by cutter 311 from the outset, when a lamellar sheet is to be manufactured, as shown on FIG. 2.

The present invention therefore enables the manufacture of surface elements 1, 201 and 301 for absorbing electromagnetic waves having soundproofing qualities in the form of lamellar sheets or panels on an industrial scale and in large quantities.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process of manufacturing a surface element for absorption of electromagnetic waves, which comprises:

alternately stacking a plurality of mineral wool layers having substantially parallel oriented fibers with intermediate bands of an electrically-conducting material into a pile;

cutting the pile perpendicularly with respect to the orientation of said fibers into pads having faces formed by cutting the pile;

laying the pads so that cut faces of the pads define a large surface area of the surface element;

cladding backing strip means to two faces of the surface element wherein the step of cladding the backing strip means comprises cladding a metal foil to at least one face of the surface element for acting as an internal reflector of the electromagnetic waves; and cutting the surface element clad on both surfaces parallel to the two faces clad to the surface element in order to obtain two surface elements which are each clad on a single face.

2. The process according to claim 1, wherein the step of cladding the backing strip means comprises cladding one face of the surface element with aluminum foil and cladding an opposite face with a non-woven fiber material.

3. The process according to claim 1, which comprises cutting the pile with a double-toothed sharp undulated cutter with a reciprocating movement of the cutter.

4. The process according to claim 3, which comprises driving the cutter so that the pads are cut from the pile by the cutter during vertical to-and-fro movement of the cutter.

5. The process according to claim 1, wherein cutting the pile comprises cutting the pile with a double-toothed undulated cutter with a reciprocating movement of the cutter.

6. The process according to claim 4, which comprises cutting the pile with a double-toothed sharp undulated cutter with a reciprocating movement of the cutter.

* * * * *